United States Patent
Lecolier et al.

(10) Patent No.: US 7,540,915 B2
(45) Date of Patent: Jun. 2, 2009

(54) OIL-WELL CEMENT SLURRY

(75) Inventors: Eric Lecolier, Chaville (FR); Alain Rivereau, Rueil Malmaison (FR); Annie Audibert, Croissy sur Seine (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 468 days.

(21) Appl. No.: 10/573,596

(22) PCT Filed: Sep. 17, 2004

(86) PCT No.: PCT/FR2004/002362

§ 371 (c)(1),
(2), (4) Date: Mar. 24, 2006

(87) PCT Pub. No.: WO2005/031114

PCT Pub. Date: Apr. 7, 2005

(65) Prior Publication Data

US 2006/0289163 A1    Dec. 28, 2006

(30) Foreign Application Priority Data

Sep. 24, 2003  (FR) .................................. 03 11195

(51) Int. Cl.
*C04B 7/32* (2006.01)

(52) U.S. Cl. ........................ 106/692; 166/285
(58) Field of Classification Search .................. 106/692
See application file for complete search history.

(56) References Cited

U.S. PATENT DOCUMENTS

| 6,060,535 A * | 5/2000 | Villar et al. ............... 166/293 |
| 6,332,920 B1 * | 12/2001 | Noik et al. ............... 106/692 |
| 6,417,268 B1 * | 7/2002 | Zhang et al. ............... 524/833 |

FOREIGN PATENT DOCUMENTS

| DE | DD 152 776 | 12/1981 |
| WO | WO 99/23046 | 5/1999 |

* cited by examiner

*Primary Examiner*—Jennifer H Gay
(74) *Attorney, Agent, or Firm*—Antonelli, Terry, Stout & Kraus, LLP.

(57) ABSTRACT

The invention relates to a high-performance cement comprising an alumnic cement with an aluminium content of at least more than 30%; microsilica with a grain size of 0.1 - 20 μm whereby the percentage thereof is 35 % less by weight in comparison with the weight of the cement; mineral particles with a grain size of 0.5 - 500 μm whereby the percentage thereof is 35% less by weight in comparison with the weight of the cement, the percentage of said particles being less than that of the microsilica; a water-soluble polymer fluidifying agent whereby the percentage thereof is 0.2 to 3.0% in comparison with the weight of the cement; a retarding agent which is used to control the setting time of the slurry; an amount of water the maximum thereof corresponding to 40 % in relation to the cement.

13 Claims, 2 Drawing Sheets

OIL-WELL CEMENT SLURRY

The invention relates to novel formulations for cementing slurries simultaneously having good mechanical properties and very good chemical stability regardless of the chemical environment in which they are employed. In particular, said slurries may be used for cementing operations in exploration wells or wells for exploitation of subterranean fields such as hydrocarbon reservoirs or geothermal reservoirs.

Well cementing operations are complex and have multiple aims: ensuring mechanical hold of casings in the geological formation, isolating a productive bed from adjacent beds, protecting casings against corrosion due to fluids which could be contained in the traversed bed. Thus, cement sheaths must have good mechanical strength and low permeability to fluids and gases which may be contained in the formations.

To guarantee hydrocarbon production throughout the exploitation of a field and for environmental protection aspects, it is vital to provide cementing materials with a very low permeability, excellent mechanical properties and long term chemical resistance. Cementing materials having all these qualities simultaneously would guarantee safe confinement of fluids and thus would contribute to environmental protection.

To satisfy durability objectives, it appears judicious to use a material having a very low permeability. In fact, in this case, the low porosity and low permeability values which result therefrom limit the penetration of aggressive species in the matrix.

Formulations for cementing materials are known which result in these very good mechanical properties and durability, for example as described in European document EP-A-0 950 034. However, that condition is not sufficient to obtain a high durability cementing material in particular in aggressive environments, and in particular for external acidic media, for example in reservoirs with a high $H_2S$ content, or intended for $CO_2$ sequestration.

Thus, the present invention concerns a high performance cement comprising:

- an aluminous cement the alumina content of which is at least 30%;
- a microsilica with a granulometry in the range 0.1 to 20 μm the percentage of which is less than 35% by weight with respect to the weight of cement;
- mineral particles with a granulometry in the range 0.5 to 500 μm the percentage of which is less than 35% by weight with respect to the cement, the percentage of said particles remaining below the percentage of said microsilica;
- a hydrosoluble fluidifying agent the percentage of which is in the range 0.2% to 3% with respect to the weight of cement;
- a retarding agent to control the setting time of the slurry;
- water in a quantity of at most 40% with respect to the cement.

The hydrosoluble polymer may be a polynaphthalene sulphonate and/or a polyxyethylene polycarboxylate.

The water content may be less than 30%, in particular equal to 27%.

The slurry may also comprise a quantity, in aqueous solution, of at least one associative polymer containing hydrophilic motifs Hy and hydrophobic motifs Hb containing C1 to C30 alkyl, aryl or alkyl-aryl groups.

The associative polymer may have a molecular mass in the range $10^4$ to $5 \times 10^6$ daltons and a number of hydrophobic motifs Hb in the range 0.5% to 60%.

In accordance with the invention, the slurry may comprise (with respect to the weight of cement):

- 24% of microsilica;
- 20% of mineral particles;
- 0.5% of fluidifying polymer.

The slurry may comprise 0.5% of associative polymer.

The invention also concerns a use of the slurry described above, to cement a well in an acidic environment.

The Applicant has demonstrated that the cement slurry must result from a combination of mineral components which are chemically stable once placed in contact with aggressive external media.

To this end, the invention recommends using calcium aluminate cements which have excellent behaviour in aggressive media (in particular at very low pH) as they do not liberate portlandite during hydration. Further, the hydrates formed, tricalcium aluminate hexahydrate and gibbsite, are chemically more resistant, under the temperature conditions observed in oil wells, than the hydrated calcium silicates resulting from Portland cements.

The products from hydration of aluminous cements vary in nature depending on the temperature at which they occur. Hence, for temperatures of less than 50° C., monocalcium aluminate hydrate ($CAH_{10}$), dicalcium aluminate hydrate ($C_2AH_8$) and gibbsite ($AH_3$) are the principal hydrated phases formed. However, monocalcium aluminate hydrate and dicalcium aluminate hydrate are two metastable compounds. Over time, these chemical compounds will be transformed into tricalcium aluminate hexahydrate ($C_3AH_6$), which is the thermodynamically stable compound in the $Al_2O_3$—$CaO$—$H_2O$ system. This chemical transformation is accompanied by an increase in porosity and thus a reduction in mechanical strength. This phenomenon constitutes one of the major disadvantages of aluminous cements. However, it has been shown that this phase transformation is not a problem when using aluminous cement slurries in oil wells. In fact, for temperatures of over 50° C., which are routinely encountered in oil wells, the hydrate formed is tricalcium aluminate hexahydrate which is the stable compound; in this case, there is no drop in mechanical strength.

Further, the hydrates formed precipitate in the whole of the porosity of the material, and not on the grain surface as is the case with Portland cement. Thus, the porosity of materials obtained with calcium aluminate cements are reduced, which goes towards improving the mechanical strength and the durability.

The invention will be better understood and its advantages will become clearer from the following examples and tests which are in no way limiting and are illustrated by the accompanying drawings, in which.

Figure 1:
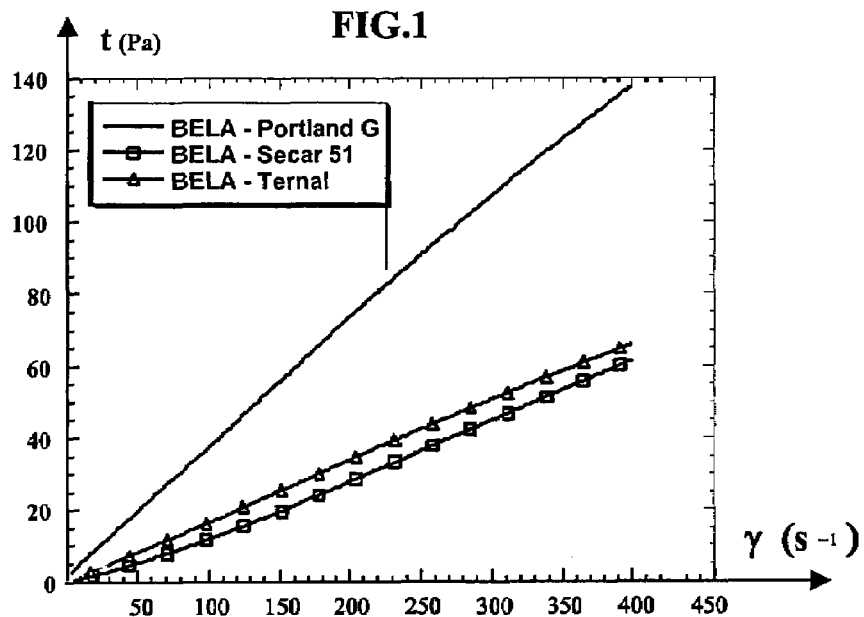
FIG. 1 shows the rheological curves for the formulations of the examples.

In the examples of slurry formulations of the invention, the aluminous cements used in this invention were as follows: Secar 51 and Ternal produced by Lafarge Aluminates (France).

The oxide compositions for Ternal and Secar 51 are shown in Table 1.

TABLE 1

| Oxide compositions for calcium aluminate cements | | Ternal | Secar 51 |
|---|---|---|---|
| Oxide composition | Al$_2$O$_3$ | 39.3 | 52.0 |
| | CaO | 35.4 | 36.7 |
| | SiO$_2$ | 4.0 | 4.3 |
| | Fe$_2$O$_3$ + FeO | 14.6 | 1.3 |

(as a percentage with respect to the total weight)

The mean diameters of the aluminous cements used were as follows:
Secar 51: D50=19 μm (Dmini=0.4 μm, Dmaxi=160 μm)–specific surface area=2.3 m$^2$/g;
Ternal: D50=21 μm (Dmini=0.4 μm, Dmaxi=182 μm)–specific surface area =2.38 m$^2$/g.

The value D50 represents the particle size below which 50% of the particles have a dimension of less than this D50 value.

The compactness of the cementing materials based on aluminous cements was optimized by combining the following components:

a Ternal or Secar 51 type aluminous cement the alumina content of which is at least 30%;

a microsilica with a granulometry in the range 0.1 to 30 μm (BET specific surface area of 18 m$^2$/g) wherein the percentage in the composition of the invention is in the range 15% to 35% by weight with respect to the cement;

an addition of mineral particles with a granulometry in the range 1 to 400 μm (D50=42 μm–specific surface area=0.46 m$^2$/g) the percentage of which in the formulation is in the range 10% to 35% by weight with respect to the cement, with the supplemental condition that this percentage remains lower than the percentage of microsilica, to satisfy compaction optimization;

a hydrosoluble polymer agent to fluidify the slurry. The percentage of fluidifying agent is in the range 0.2% to 3.0% with respect to the aluminous cement. The hydrosoluble polymer may be either a polynapthalene sulphonate or a polyoxyethylene polycarboxylate;

a retarding agent to control setting for temperatures of more than 30° C.;

water in a quantity of at most 40% with respect to the weight of cement, and preferably less than 30%, in particular equal to 27%.

The formulation may also contain associative polymers to control any problems with stability of the slurry (i.e. avoid the phenomenon of sedimentation of mineral particles: cements, silica, etc).

These associative polymers may be a polymer with hydrophilic motifs (Hy) and hydrophobic motifs (Hb) in aqueous solution, the hydrophobic motifs (Hb) containing C1 to C30alkyl, aryl or alkyl-aryl groups, the polymer having the following structure: -(Hb)-(Hy)-, in a random distribution, in which:

Hy is of the form:

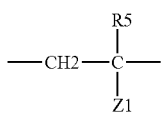

in which R5 is H or CH3, and Z1 is COOH or CONH2 or CONHR1SO3 or CONHR"1, where R"1 is CH3;

or of the form:

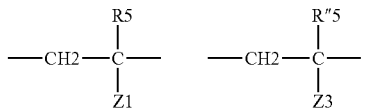

in which R5 is H or CH3, and Z1 is CONH2 or CONHR"1, R"1 is CH3 and in which R"5 is H or CH3, and Z3 is COOH or CONHR1SO3, in which R1 is C3H8, or C6H5;

Hb is of the form:

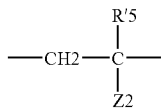

in which R'5 is H or CH3 and Z2 is COOR7, COOR'1, CONR1R'1 or CONR1R7, R7 being a non ionic surfactant constituted by an alkyl polyoxyethylenic chain, R1 is H or a C1-C30 alkyl, aryl or alkyl-aryl radical, and R'1 is a C1-C30 alkyl, aryl or alkyl-aryl radical.

In a variation, the polymer may have a molecular mass in the range 10$^4$ to 5×10$^8$ Daltons and with a hydrophobic motif Hb content in the range 0.5% to 60%.

The associative polymer may be selected from the group constituted by:

HMPAM1: in which R5 is H and Z1 is CONH2, R'5=CH3, Z2 is COOR'1, in which R'1=C9H19;

HMPAM2: in which R5 is H and Z1 is CONH2, R'5=H, Z2 is CONR'1R'1, in which R'1=C6H13;

HMPAM3: in which R5 is H and Z1 is CONH2, R"5=H, Z3 is COOH or CONHR1SO3, in which R1 is C3H8 (AMPS), R'5=H, Z2 is CONR'1R'1, in which R'1=C6H13;

S1: in which R5 is H and Z1 is CONH2, R'5=H and Z2 is C6H4SO3H;

HB1: in which R5 is H, Z1 is COOH, R'5 is H and Z2 is COOR'1, in which R'1=C4H9.

In particular, the polymer denoted HMPAM1 or HMPAM2 or HMPAM3 may have a molecular mass in the range 5×10$^5$ to 2×10$^6$ daltons and with a hydrophobe content (Hb) in the range 0.5% to 3%.

The polymer S1, acrylamide (Hy)/styrene sulphonate (Hb) copolymer, which may or may not be branched, as described above may have a molar ratio of about 50/50 and a molar mass in the range 5×10$^5$ to 5×10$^6$ daltons. In the case in which it is branched, it is denoted S2. The branching agent used in this case may be N,N'-methylene bis acrylamide, MBA.

The polymer HB1, acrylate (Hy)/butyl acrylate (Hb) copolymer, in which R5 is H, Z1 is COOH, R'5 is H and Z2 is COOR'1, in which R'1 is a C4 motif, may comprise about 80% of acrylate motifs, and have a molecular mass in the range 10$^4$ to 5×10$^4$ daltons.

The following various formulations were tested:
BELA-Portland G:
  Portland G cement: 100;
  Silica fume: 24;
  Ground sand: 20;
  Fluidifying agent: 0.5 g dry matter;
BELA-Secar 51:
  Secar cement 51: 100;
  Silica fume: 24

Ground sand: 20;
Fluidifying agent: 0.5 g of dry matter
Associative polymer: 0.5 g of dry matter;
BELA-Ternal:
Ternal cement: 100;
Silica fume: 24;
Ground sand: 20;
Fluidifying agent: 0.5 g dry matter;

Test 1: Dispersion

Dispersion was evaluated by measuring the density of various sections of a 20 centimetre high cylindrical sample.

a) BELA-Secar 51 formulation without associative polymer (in grams).

The density of a section of the sample taken from the top of the cylinder was 2.0 g/cm$^3$, while a section taken from the bottom of the sample had a density of 2.4 g/cm$^3$.

b) BELA-Secar 51 (with associative polymer).

The density of a section of the sample taken from the top of the cylinder was 2.25 g/cm$^3$, while a section taken from the bottom of the sample had a density of 2.23 g/cm$^3$.

The associative polymer was effective even in small quantities, as regards controlling the dispersion of solids in the slurry.

The concentration of associative polymer was adjusted as a function of the respective proportions of the various mineral compounds of the formulation.

Test 2: Rheological Properties

FIG. 1 shows the three Theological curves for the three formulations in the examples, with the shear rate (in s$^{-1}$) along the abscissa and the shear stress (in Pascals) up the ordinate.

The measurements were carried out in a Haake type viscosimeter with grooved coaxial cylinders.

The rheological parameters of high performance cements based on Portland cement (class G) and aluminous cements (Secar 51 and Ternal) are shown in the following table:

|  | Viscosity (mPa·s$^{-1}$) | Flow threshold (Pa) |
|---|---|---|
| BELA-Portland Class G | 343 | 3.6 |
| BELA-Secar 51 | 148 | 0 |
| BELA-Ternal | 168 | 0 |

Figure 2A:
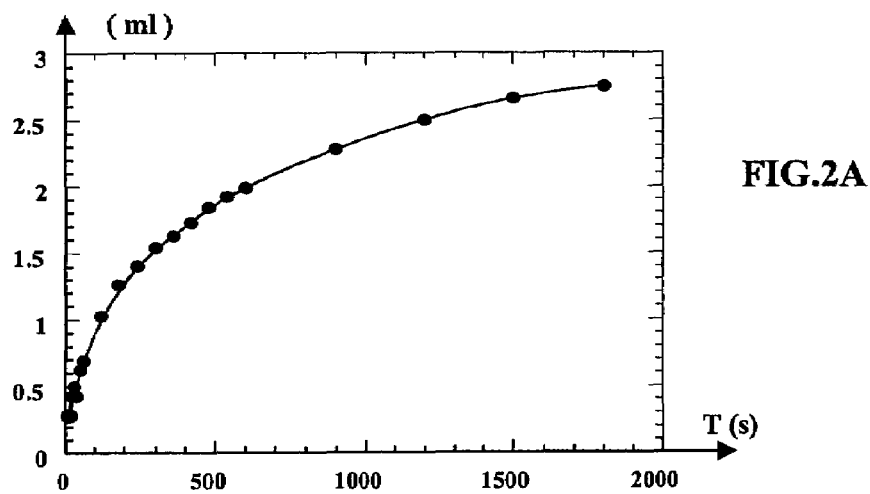
FIGS. 2a and 2b show filtration curves at ambient temperature and at 80° C. for the BELA-Ternal formulation.
Figure 2B:
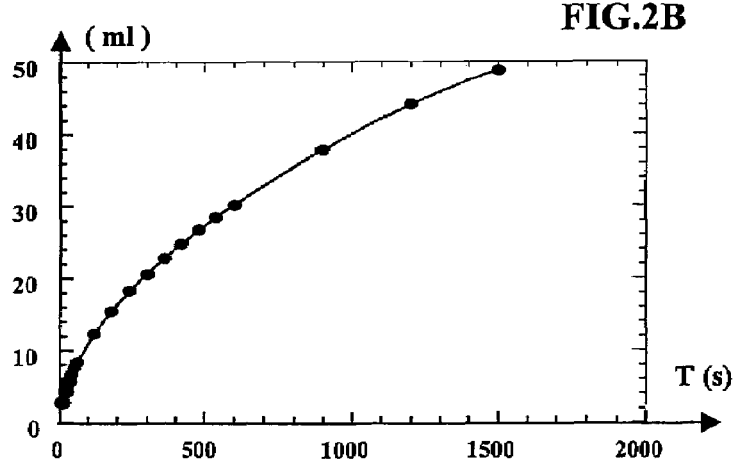

Test 3: Filtration Properties:

FIGS. 2a and 2b respectively show the filtrate (in milliliters up the ordinate) as a function of time (in seconds, along the abscissa) for a temperature of 20° C. and a temperature of 80° C. in the case of a BELA-Ternal formulation the fluidifying polymer for which was polynaphthalene sulphonate (for example from HANDY Chemical, Canada).

The measurements were made in static filtration mode in a Baroid type HP/HT cell.

It was shown that the filtrate at 30 minutes for a BELA-Ternal at ambient temperature was 2.75 ml, and at 80° C., it was 53 ml.

By comparison, the 30 minute filtrate for BELA-Portland G at ambient temperature was 12.5 ml with the same fluidifying polymer.

Test 4: Pumpability Time

The measurements were made in a Chandler type consistometer (Model 8240).

The pumpability times for the various formulations at ambient temperature and pressure and at 80° C. and 180 bar are given in the following table:

| T (° C.) and P (bar) | | BELA-class G | BELA - Secar 51 | BELA-Ternal |
|---|---|---|---|---|
| 20 | 5 | 25 h | 26 h 17 | 12 h 33 |
| 80 | 180 | 1 h 50 | 49 min | 49 min |

It is possible to retard the setting of aluminous cements, in particular when the temperature is high (80° C.). To this end, a retarding additive is used, for example the AL810 retarding agent produced by Chryso SA (France). By adjusting the concentration of AL810 in the cement slurry, it is possible to adjust the setting time at 80° C. to between 49 minutes and 4 h30.

Figure 3:
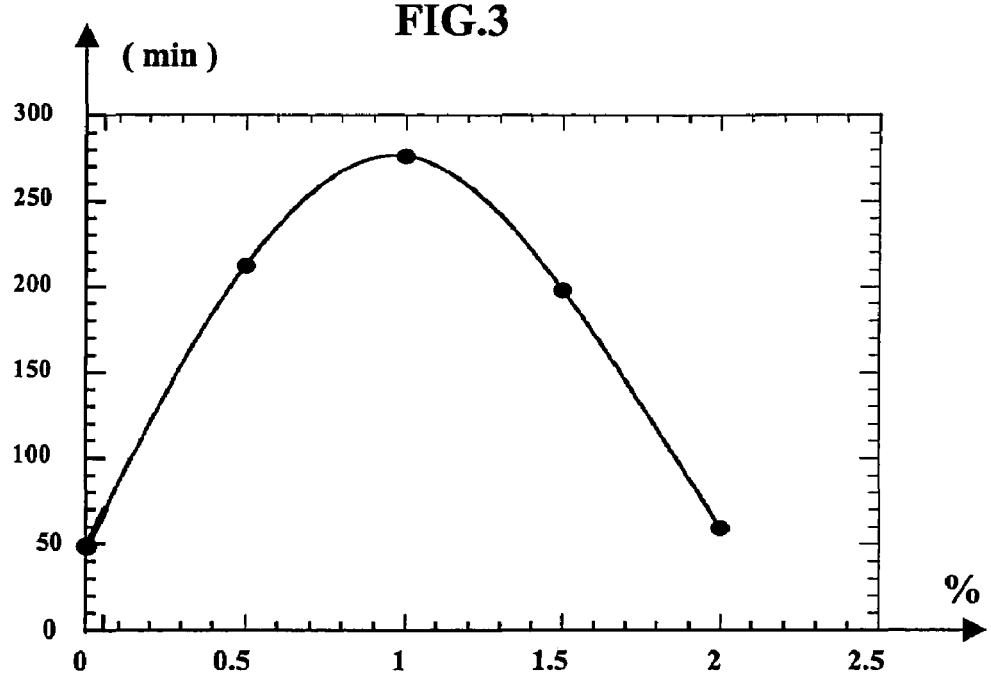
FIG. 3 shows the retarding agent concentration as a function of the setting time of the BELA-Ternal formulation.

FIG. 3 shows the curve of pumpability time (up the ordinate, in minutes) as a function of the concentration of retarding agent (as a percentage with respect to the cement, along the abscissa).

Test 5: Mechanical Properties:

The tests were carried out on a conventional compression rig.

The compressive strength for a BELA-class G at ambient pressure and temperature was in the range 90 to 110 Mpa.

The compressive strength for a BELA-Secar 51 at ambient pressure and temperature was in the range 100 to 130 MPa The compressive strength for a BELA-Ternal at ambient pressure and temperature was in the range 90 to 110 MPa It can be seen that aluminous cements formed from the formulations of the invention could produce high mechanical strength materials.

Figure 4:
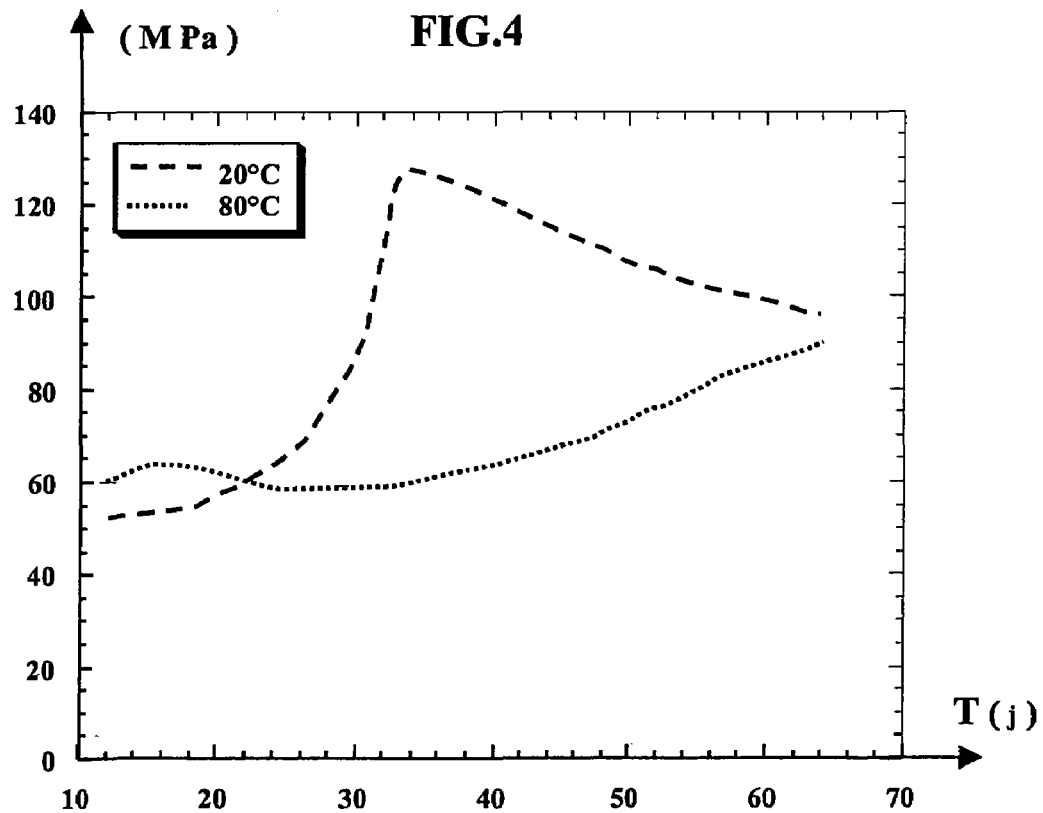
FIG. 4 shows the change in compressive strength of a material sample as a function of time.

FIG. 4 shows the change with time (in days) of the compressive strength (in MPa) of a BELA-Ternal cement sample at 20° C. (curve A) and at 80° C. (curve B).

It can be seen that the BELA-Ternal, which ages at temperature, does not exhibit a reduction in compressive strength.

Test 6: Resistance to Acidic Media:

The BELA-Ternal and BELA-Secar 51 had good durability in contact with aggressive fluids. After ageing for 28 days in an acidic solution at a pH of 1, the compressive strength of a BELA-Ternal sample was 95 Mpa, while the compressive strength of a BELA-Ternal sample immersed in water for the same period was 98 MPa. The drop in mechanical strength was thus only 3% for this material, when it is aged in an acidic fluid.

The compressive strength of a conventional Ternal cement at 28 days aged in an acid solution at a pH of 1 is 67 MPa, while it is 100 MPa for the same cement aged in water. The drop in mechanical strength for this cement in contact with an aggressive fluid is more than 30%.

The elastic modulus of BELA-Ternal aged for 70 days in an acidic solution at a pH of 1 decreased by 15% to 20% with respect to the same material aged in a non aggressive medium. The elastic modulus of BELA-Portland aged for 70 days in an acidic solution at a pH of 1 decreased by 30% with respect to the same material aged in water.

Thus, it is clear that formulations of the invention of the BELA-Ternal and BELA-Secar 51 type can improve the durability of cementing materials, in particular in an acidic medium.

Further, optimization of compactness combined with a reduction in porosity result in improved resistance of the durability of the material because of the good resistance of aluminous cements to aggressive agents and the low penetration of these agents due to low permeability.

The invention claimed is:

1. A cementing slurry comprising:
   an aluminous cement the alumina content of which is at least 30%;
   a microsilica with a granulometry in the range 0.1 to 20 µm the percentage of which is less than 35% by weight with respect to the weight of cement;
   mineral particles with a granulometry in the range 0.5 to 500 µm the percentage of which is less than 35% by weight with respect to the cement, the percentage of said particles remaining below the percentage of said microsilica;
   a hydrosoluble fluidifying agent the percentage of which is in the range 0.2% to 3% with respect to the weight of cement;
   a retarding agent to control the setting time of the slurry;
   water in a quantity of at most 40% with respect to the cement.

2. A slurry according to claim 1, in which the hydrosoluble fluidifying agent is at least one member selected from the group consisting of a polynapthalene sulphonate and a polyxyethylene polycarboxylate.

3. A slurry according to claim 1, in which the water content is below 30%.

4. A slurry according to claim 1, further comprising a quantity, in aqueous solution, of at least one associative polymer containing hydrophilic motifs Hy and hydrophobic motifs Hb containing C1 to C30 alkyl, aryl or alkyl-aryl groups.

5. A slurry according to claim 4, in which said polymer has a molecular mass in the range $10^4$ to $5 \times 10^6$ daltons and a number of hydrophobic motifs Hb in the range 0.5% to 60%.

6. A slurry according to claim 4, comprising 0.5% of associative polymer.

7. A slurry according to claim 1, comprising (with respect to the weight of cement):
   24% of microsilica;
   20% of mineral particles;
   0.5% of fluidifying polymer.

8. A method for using a slurry, comprising cementing a well in an acidic environment with the slurry according to claim 1.

9. The method according to claim 8, wherein the cementing produces a cement with a compressive strength of at least 90 MPa.

10. The method according to claim 8, wherein the cementing produces a cement with a compressive strength of at least 100 MPa.

11. A slurry according to claim 1, in which the water content is 27%.

12. A slurry according to claim 1, in which a cement produced from the slurry has a compressive strength of at least 90 MPa.

13. A slurry according to claim 1, in which a cement produced from the slurry has a compressive strength of at least 100 MPa.

* * * * *